Figure 1:
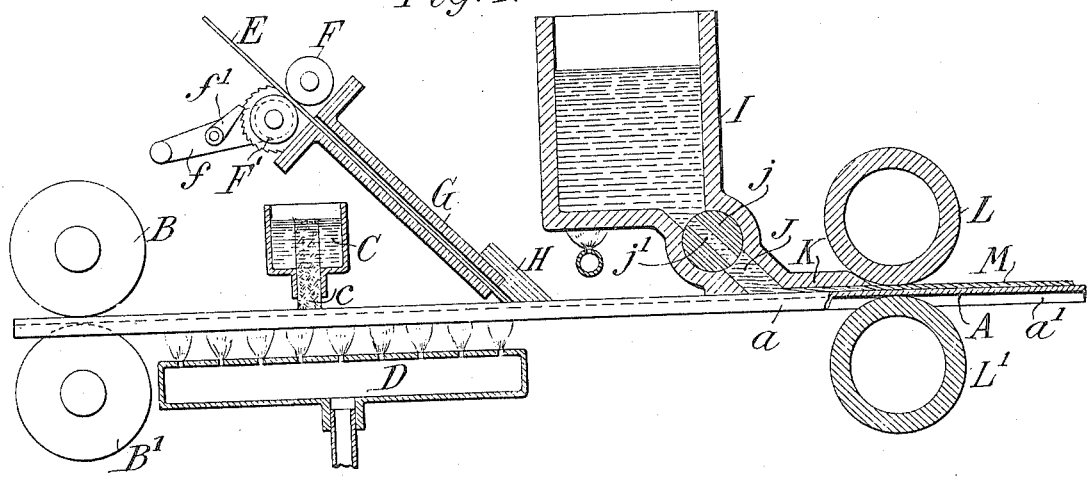

W. KLOCKE.
METHOD OF MAKING LINED BEARINGS.
APPLICATION FILED MAY 8, 1915.

1,180,728. Patented Apr. 25, 1916.

WITNESSES:
René Bruine
Fred White

INVENTOR
William Klocke,
By Attorneys,
Fraser, Turk & Myers

UNITED STATES PATENT OFFICE.

WILLIAM KLOCKE, OF NEW YORK, N. Y., ASSIGNOR TO PRESSED BEARING COMPANY, OF BROOKLYN, NEW YORK, A CORPORATION OF NEW YORK.

METHOD OF MAKING LINED BEARINGS.

1,180,728.

Specification of Letters Patent.    Patented Apr. 25, 1916.

Application filed May 8, 1915. Serial No. 26,753.

*To all whom it may concern:*

Be it known that I, WILLIAM KLOCKE, a citizen of the United States of America, residing in the borough of Brooklyn, county of Kings, in the city and State of New York, have invented certain new and useful Improvements in Methods of Making Lined Bearings, of which the following is a specification.

My invention relates to a new method of producing lined bearings, and has for its object to simplify and cheapen the cost of producing such bearings, and further, to improve the quality of bearings so produced.

The character of bearings to which I have illustrated my invention as being applied, has a semi-cylindrical shell provided with exterior flanges and lined with suitable bearing metal, such as Babbitt metal. Two of these semi-cylindrical bearings are employed for each bearing and are largely used in automobile construction wherein a number of such bearings are used in each machine. In the process heretofore employed for the production of such bearings a number of steps have been employed which are substantially as follows:—(1) Molding the shells, two operations; (2) milling the shells, two operations; (3) sweating two semi-cylindrical shells together; (4) boring these assembled shells; (5) outside turning; (6) heating the shell, applying acid and tinning; (7) babbitting; (8) inside boring; (9) outside turning; (10) splitting the shell; (11) densifying the babbitt by driving a drift.

The operation above referred to was hand labor, and involved a loss of metal in turning amounting to as much as 27%, and as a considerable amount of this was expensive Babbitt-metal which could not be reclaimed, it was a serious increase in expense.

According to my invention a large amount of hand labor is dispensed with and the several operations incident to the preparation of the lined bearings are continuously performed upon the metal which is to form the lining, largely by the aid of devices which act without the constant attention of a workman, and when the metal has been properly prepared it is formed in a press by the aid of male and female dies. The said operations result in the production of a lined bearing which, in many instances, will have such a smooth surface of the liner that the same will be ready for use without any subsequent turning, and by said method much additional labor will be avoided and the saving of expensive metal accomplished.

My invention consists in a succession of steps which may involve preliminary flanging of a strip, or may be performed upon a flanged strip which has been flanged elsewhere or the method may be performed upon an unflanged strip. To the said strip a liner of bearing metal is applied, and the sections of the desired size to constitute a blank from which the semi-cylindrical bearings will be formed are then formed in a press by the aid of dies, to the desired form. During these operations the desired densification of the lining will be accomplished, and the bearing so subjected to the action of the die will be found to have its lining extremely smooth, so that it may usually be used without further treatment, although if desired, such treatment by way of smoothing the surface of the lining may be performed.

I have illustrated, in the accompanying drawings, a simple form of apparatus which may be employed in the continuous steps forming part of my invention, and also dies.

Figures 2, 3:
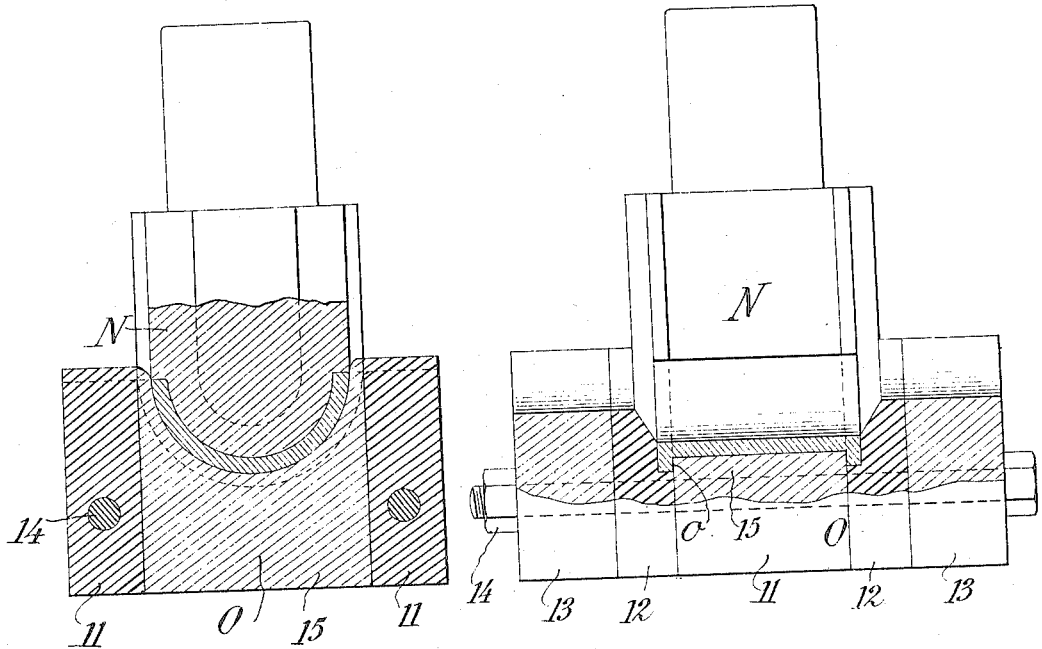

In the said drawings.—Figure 1 is a diagrammatic view illustrating devices which may be employed in the practical operation of my invention. Fig. 2 is a sectional view of the dies, illustrating a lined bearing in place, taken on a line between the flanges and parallel therewith. Fig. 3 is a similar section taken on a line at right angles to Fig. 2, the male die being in full lines.

In the practical embodiment of my invention I prefer to operate upon a strip of metal, for which purpose brass is usually employed, which serves as the body or shell of the lined bearing and upon the inside of which, or the side opposite the flanges, the liner will be placed. A strip of such flanged liner will be placed. A strip of such flanged metal is subjected to a successive series of steps resulting in the application to the plane surface thereof of a liner of suitable metal, for which purpose Babbitt-metal is principally employed. As one of the steps in the continuous production of such lined strip, I prefer to densify the liner after the same has been applied, for which purpose it is subjected to pressure, whereby not only is its surface made even and uniform and the thickness of the liner accurately gaged, but the metal is compacted and given the desired increase in density. Thereupon the strip which has been so treated is separated into blanks of a size suitable for the production of a semi-cylindrical lined bearing. I then place these lined blanks in a press, wherein they are subjected to the action of a male die by which they are pressed into a corresponding female die, preferably with sufficient pressure to thoroughly compact and smooth the inner surface of the lining. The result will be a finished lined half bearing which, if desired, may have its interior surface formed sufficiently smooth to be ready for use. The particular steps of the process as I actually prefer to employ the same, will now be set out in detail. The production of the flanged strip may be accomplished by taking a plane strip, bending its edges to form flanges in suitable rollers, and upsetting these flanges so produced to increase their thickness. The upsetting operation may be performed in the usual manner by rollers or dies, and as these rollers and dies for rolling and upsetting flanged strips are well known and form no part of my invention, they are not herein illustrated.

The process of applying the liner to the backing is preferably performed upon material, either in strips or separate blanks, which has previously been flanged, but this flange might, if desired, be formed after the lining is applied, or the process might be performed upon an unflanged blank.

One way by which the liner may be applied is illustrated in the diagrammatic view, Fig. 1, wherein the several steps incidental to the production of the lined blanks are illustrated as being performed continuously. In the said figure the blank, which is illustrated as being a flanged blank A, is fed between upper and lower feed rolls B B¹ to the operation of the subsequent devices. In the usual application of Babbitt-metal the surface of the metal is first cleaned and tinned, and I have accordingly illustrated means for continuously performing such steps. The surface of the brass is cleaned preferably by the application, as usual, of muriatic acid thereto, and this is contained in an acid holder C, and the acid is applied to the surface of the brass as by means of a wick c which passes from the inside of the tank through an opening in the bottom so as to be in contact with the strip A. This acid applying means and the other means illustrated are the full width of the plane side of the strip. The strip having been thus cleaned, is subjected to the action of heating means, for which purpose I employ a gas heating apparatus D of usual construction, which is illustrated as extending from a point near the feeding rolls to a point near the liner applying means, so that the strip shall be thoroughly heated. After the cleaning the face of the strip is tinned by the application of solder thereto, and preferably the solder is fed in a strip E by upper and lower feed rolls F F¹ through a guide G to the strip. The usual copper distributer or "iron" H distributes the solder evenly over the surface of the strip A. The lower roll F¹ is the solder feed roll and it is supported in arms f, only one of which is seen, and is prevented from back movement by pawl and ratchet f¹, and is preferably fed continuously by any suitable means. The usual solder will be employed, and for this purpose hard solder is generally used. The surface of the strip having been so tinned is then coated with the liner. The molten Babbitt-metal, which is the metal usually employed for such liners, is contained within a vat I which has a channel J leading to the surface to be tinned, and this channel contains a rotary valve j having a passage j¹ which is adjustable by a rotation of the valve j. The forward wall of the channel J has a flange K which extends in the direction in which the strip is being fed, and is located above the strip a distance corresponding to the thickness of the liner which it is desired to apply. The liner is flowed on to the strip as the same is fed forwardly through the passage j¹, and its surface is smoothed and it is brought to the proper thickness by the flange K. Other means may be employed to accomplish this result, but this is a convenient and practical way of doing it. After the liner has been applied to the surface of the strip A it is preferably densified or compacted, and for this purpose I provide the upper and lower rotary rollers L L¹. The lower roller engages the bottom of the strip between the flanges a, a¹ and the upper roller engages against the liner M as regulated by the height of the flange K, and accordingly, they compact and densify the said liner. The rollers are preferably cooled, as for instance, by means of water, in the usual way, and may be revolved by suitable means in unison with feed rolls B, B¹.

It will be perceived that the foregoing steps of my invention, whereby lined blanks are produced, are continuously performed by the aid of apparatus which is automatic in its action, and that by the aid thereof I am enabled to produce a lined strip, the liner of which is perfectly smooth and even, and of uniform thickness, and wherein no lining metal is wasted. The saving of lining metal incidental to the use of my process is an important consideration, as this metal is practically valueless for lining purposes after having been once heated, as the antimony constituent thereof is lost upon a re-heating of the metal, and in actual practice such Babbitt-metal as is removed by turning or filing in the usual process is treated as scrap metal. The lined strip A is next divided into blanks of a suitable size to provide half liners, and for this purpose any suitable cutting die or metal saw may be employed. The mechanism for performing this operation is well-known to any skilled mechanic, and accordingly, I have not illustrated the same. The lined blanks so produced are then flanged, if flanged bearings are to be produced, and if the strip was not flanged previous to lining, which is the preferred way of producing the article. The flanged blank is now ready to be formed into the semi-cylindrical shape of the lined bearings when ready for use. An important part of my invention is the way in which the said flanged blanks are formed into this shape. It is desirable that this operation should be accompanied with little or no loss of metal, and further, it is inexpedient to form the same in a drop press by reason of the fact that this operation results in the production of fins in the finished article which must be removed, thereby greatly increasing the labor and resulting in the loss of metal.

According to my invention the flanged blank is formed into semi-cylindrical shape by the aid of a die press, and I have illustrated, in Figs. 2 and 3, male and female dies which are adapted to be used for this purpose. Single acting presses which may be used for this purpose are well known and form no part of my invention. The upper or male die N has its working face conforming to the shape of the inner or lined face of the bearing to be produced. The lower or female die O is of corresponding shape and is provided with channels o upon each side adapted to receive the flanges of the bearing when the same is pressed to final shape.

The lined bearing is placed upon the female die with its flanges down, and the male die descends and presses the same into the opening in the female die. It is important that this pressing operation should be correctly timed. If performed too slowly it will result in a malformation of the blank, due to the fact that it is not feasible to obtain metal having precisely the same hardness throughout, and accordingly, the too slow descent of the male die will result in bending the blank at the softest portions and it will be caused to slip in the female die and be ruined. If the press works too fast it will crack the metal. I have found that a speed of about fifty strokes to the minute will result in the production of perfect work. By applying sufficient pressure to the dies the lining may be thoroughly smoothed between the male and female dies, and thereby a smooth and even surface to the liner may be obtained. My preferred method is that wherein the blank is pressed cold in a press.

A further advantage of the pressing of the flanged blank to shape in a die press is that by means thereof the liner is further densified and compacted, by reason of the fact that the liner, during the bending process, is caused to occupy less space than it previously occupied, and this results in an advantageous increase in the density of the liner metal.

My invention preferably contemplates the employment of self-acting devices for the several steps incidental to the preparation of the lined blank previous to insertion in the press, but obviously, such steps are not necessarily performed by such self-acting devices, but may be performed by hand and at the same time obtain the advantages of my invention. Obviously, the strip of metal, if the liner is to be applied thereto in the manner shown, could be cleaned and tinned by hand, and the liner could be also applied by hand and scraped or leveled by hand in the usual way before densifying, and the application of Babbitt-metal by hand is an operation well-known to mechanics. I prefer, however, to densify the lining before pressing the same to final shape, and for this purpose the pressure rolls are extremely desirable. It will be seen, therefore, that according to my invention the liner is applied to a flat plate whereby its even application is assured and loss of metal is overcome, and preferably, this application is made to a strip of metal which will furnish a plurality of blanks by successively acting automatic apparatus, and to a strip which has previously been flanged.

The steps previous to the formation of the flat flanged blank to semi-cylindrical shape may be varied, as indicated in the foregoing description, within the limits of the appended claims. It is an important feature of my invention that the flanged blank should be formed into the final semi-cylindrical shape in a press.

It is preferable to construct the female die in sections in order to enable the hardest metal to be used where the ends of the liner are shaped, and to enable ready adjustment for liners of different lengths. In Fig. 3 the die is shown as made up of a middle section 11 flanked by sections 12—12, and these in turn by end sections 13—13, all fastened together by bolts 14. The sections 12—12 may be made of hardened tool steel to more effectively shape the flanged ends of the liner. To facilitate the removal of the liner from the female die the middle portion of the latter is made as a movable plunger 15, as shown best in Fig. 2. As the upper die ascends, this plunger may be displaced upwardly to lift the liner above the remaining sections of the female die and enable it to be readily separated therefrom.

What is claimed is:—

1. A process for the production of lined bearings comprising flanging a strip of metal, upsetting the flanges to thicken same and passing the flanged strip through a continuous process wherein the strip is treated with acid and is heated, and solder and lining material successively applied thereto while so heated, then densifying the lining by cooled pressure rolls, separating the strips into blanks and pressing the flanged blanks to semi-cylindrical shape.

2. A process for the production of lined bearings comprising flanging a strip of metal, heating the flanged strip, applying acid, coating the same with solder, flowing lining material thereon, densifying the lining, separating the strip into blanks, and pressing the flanged blanks to shape.

3. A process for the production of lined half bearings consisting in flanging a strip of metal, feeding the flanged strip, and during such feeding in continuously cleaning the surface, heating the same, soldering a metal lining thereon, and densifying the lining, then separating the strip into blanks, and pressing the flanged and lined blanks to semi-cylindrical shape.

4. A process for the production of lined half bearings comprising cleaning and tinning the surface of a straight blank, applying molten lining metal on said blank, densifying said lined blank and the formation of such lined blank to semi-cylindrical shape by pressing between dies.

5. A process for the production of lined half bearings comprising the continuous application of lining metal to a metallic strip, densifying such lining, separating the strip into blanks and pressing the blanks to semi-cylindrical shape.

6. A process for the production of lined half bearings comprising cleaning the surface of a strip of metal and heating the same, and continuously soldering lining metal thereon.

7. A process for the production of lined half bearings comprising continuously feeding a strip of metal and during such feed in heating the strip, cleaning the surface thereof, applying solder thereto, flowing lining metal thereon, and densifying the liner by passing the lined strip between pressure rolls.

8. A process for the production of lined half bearings comprising continuously feeding a strip of metal and during such feed in heating the strip, cleaning the surface thereof, applying solder thereto, flowing lining metal thereon, and densifying the liner by passing the lined strip between pressure rolls, separating the strip into blanks and pressing the blanks to semi-cylindrical shape.

9. A process for the production of lined flanged half bearings comprising the application of lining metal to the plane face of a flanged blank and forming such blank into semi-cylindrical shape by pressing the same between male and female dies in a press.

10. A process for the production of lined flanged half bearings comprising the application of lining material to the face of a flanged metallic strip and densifying such lining by continuous steps, separating the strip into blanks and pressing the flanged and lined blanks into semi-cylindrical shape.

11. A process for the production of lined flanged half bearings comprising cleaning the surface of a strip of flanged metal, heating the same and continuously soldering lining metal thereon, densifying such lining, separating the strip into blanks and pressing the flanged and lined blanks to semi-cylindrical shape.

12. A process for the production of lined flanged half bearings comprising continuous feeding of a strip of flanged metal and during such feed in heating the strip, cleaning the surface thereof, applying solder thereto, flowing lining metal thereon, and densifying the liner by passing the lined strip between pressure rolls, then separating the strip into blanks and pressing the flanged and lined blanks into semi-cylindrical shape.

13. A process for the production of semi-cylindrical bearings from flanged metallic blanks which consists in applying lining metal to the side of said blank opposite the flanges, inserting the blank cold in a press and forming the same to semi-cylindrical shape by the aid of male and female dies by causing the male die to engage against the lined side of said blank, and pressing the same into the female die.

14. A process for the production of semi-cylindrical bearings from flanged metallic blanks which consists in applying lining metal to the side of said blank opposite the flanges, inserting the blank cold in a press and forming the same to semi-cylindrical shape by the aid of male and female dies by causing the male die to engage against the lined side of said blank, and pressing the same into the female die with a gradual pressure obtained by operating the press at about fifty strokes a minute.

15. A process for the production of semi-cylindrical bearings from flanged metallic blanks which consists in flanging the longitudinal edges of a strip of metal, upsetting the flanges, applying lining metal to the side of said blank opposite the flanges, separating the flanged strip into blanks, inserting the blanks cold in a press and forming the same to semi-cylindrical shape by the aid of male and female dies by causing the male die to engage against the lined side of said blank, and pressing the same into the female die.

16. A process for the production of lined half bearings which consists in the continuous application of lining metal to the level surface of a strip of metal, separating said strips into blanks and forming the blanks into semi-cylindrical shape.

17. A process for the production of lined half bearings which consists in the continuous application of lining metal to the level surface of a strip of metal, separating said strips into blanks and pressing the blanks to shape in a press.

18. A process for the production of lined half bearings which consists in the application of lining metal to the level surface of a strip of metal, densifying such lining and pressing the blanks to semi-cylindrical shape.

19. A process for the production of lined half bearings which consists in soldering lining metal to the surface of a metal blank, and pressing said blank to semi-cylindrical shape.

20. A process for the production of lined half bearings which consists in soldering lining metal to the surface of a metal blank, densifying such lining and pressing said blank to semi-cylindrical shape.

21. A process for the production of lined half bearings which consists in soldering lining metal to the entire bearing surface of a metal blank and pressing said lined blank to semi-cylindrical shape.

22. A process for the production of lined half bearings which consists in the continuous application of lining metal to a metallic strip, separating the strip into blanks and pressing the blanks to semi-cylindrical shape.

23. A process for the production of lined half bearings which consists in the application of a continuous sheet of lining metal to a metallic strip, separating the strip into blanks and pressing the blanks to semi-cylindrical shape.

In witness whereof, I have hereunto signed my name in the presence of two subscribing witnesses.

WILLIAM KLOCKE.

Witnesses:
　J. E. DOBSON,
　C. R. GABRIEL.